3,212,359
DEVICES FOR LOCKING DIFFERENTIAL GEARS
Willi Ernst Salzmann, 111 Bielstrasse,
Solothurn, Switzerland
Filed Feb. 18, 1963, Ser. No. 259,786
Claims priority, application Switzerland, Feb. 26, 1962,
2,310/62
7 Claims. (Cl. 74—711)

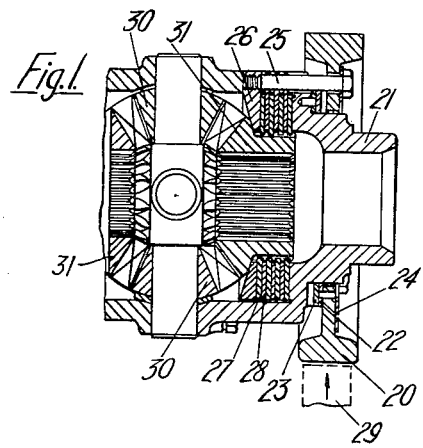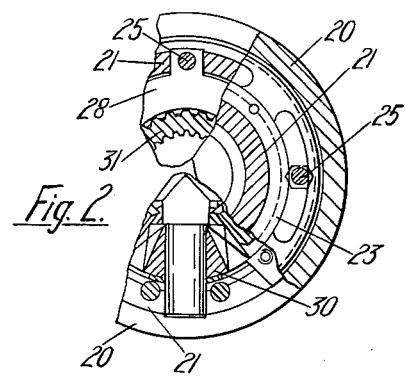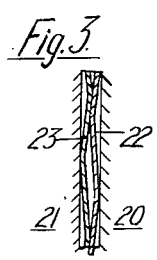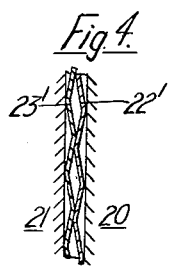

The present invention relates to devices for locking differential gears for motor vehicles, wherein locking elements operating by force application are actuated exclusively or additionally by the face cams of an operating disc, which is preferably mounted externally of the differential housing and coaxially therewith, for rotation through a certain angle. The relative movement between differential housing and operating disc is effected here either by the inertia of the disc (thus automatically on acceleration or retardation of the differential gear) or by a brake force acting upon the disc, with any actuating device.

A differential locking device is illustrated as an example of the embodiment in the accompanying drawings, wherein:

FIGURE 1 is a half longitudinal section, and FIGURE 2 is a partial cross-section and elevation of an automobile differential lock, and FIGURES 3 and 4 show details thereof.

Possible modifications which are not illustrated are briefly: Operating disc with band brake, disc brake, etc. operated mechanically, pneumatically (for example engine suction), electro-magnetically or hydraulically and directly or with remote transmission.

The illustrated automobile differential lock is force-operated, that is to say the locking is effected by friction, as is the case in the ordinary self-locking differential gears (trademarks "Spin-Resistant," "Power-Lok," "Trac-Aide," etc.). Their disadvantage as is known consists in that the locking action is greatly or exclusively dependent upon torque, and thus becomes practically zero for example on raising of a wheel. The addition according to the invention consists now in an operating disc 20 (similar to the disc 11 of the tractor lock), which is rotatable on a rotary drive input differential housing 21, concentrically, through a certain angle, and in this rotation moves to the right as a result of face cams or the like (for example two similar, corrugated, sheet steel rings 22 and 23, which are keyed on the operating disc 20 and the differential housing 21 respectively). The development is represented in FIGURE 3 with flat (self-locking) profile and in FIGURE 4 with steeper profile according to choice, both in the fully engaged position. This displacement of the operating disc 20 to the right acts through a slipping disc 24 and four tension bolts 25 upon the innermost brake disc 26, which presses the wheel brake plates 27 and housing brake plates 28 together and thus automatically brakes the differential action, as soon as the differential gear is accelerated or retarded (inertia of the operating disc 20). By braking of the operating disc 20 from the exterior (by means of the brake block 29 or the like) the locking action is reinforced, or becomes effective even at constant rotation speed of the differential housing 21. Furthermore the locking action is dependent upon the transmitted torque as a result of the separating force between the satellite wheels 30 and the drive output bevel wheel 31 (or more complicated arrangements working however in the same manner), and if necessary also upon an additional, constant spring force.

Modifications which are not illustrated are: self-locking differential with cone coupling in place of the coupling discs, tension bolts 25 with elastic intermediate member (for example, compressible cup springs between screw head and sliding disc 24 or between screw nut and brake disc 26 etc.), operating disc 20 with band brake, or, if possible with the same elements 20 to 31, bilaterally.

From the above it becomes clear that the operating disc according to the invention, which is rotated in relation to the differential housing as a result of its inertia or of a brake force acting upon it constitutes a significant improvement. This improvement is applicable practically everywhere, namely from cross-country vehicles (with preselection operation and automatic system) and passenger cars to the sport and racing cars (with exclusively automatic system, which acts mainly before, during and after the traveling of curves). Apart from the use in differential locks between two wheels of one axle the use is also possible and expedient in the case of the third differential (axle-distribution differential gear in cross-country vehicles).

Obviously these devices for locking differential gears act only during travel, but on both sides, that is to say in both forward and reverse travel.

I claim:

1. The combination comprising a differential gear and locking means for selectively locking said differential gear, said differential gear including a rotary drive input differential housing, two drive output bevel gear wheels mounted for rotation coaxially within said housing, and a plurality of satellite wheels each meshing with both of said bevel gear wheels, said locking means comprising an operating disc mounted for limited rotation upon said housing, a plurality of tension bolts mounted for axial movement in said housing and extending through slots in said operating disc, an innermost brake disc secured to said tension bolts, a plurality of housing brake plates with apertures through which said tension bolts pass, a plurality of wheel brake plates mounted for axial movement on and rotationally fixed with respect to one of said gear wheels, said housing brake plates extending between said wheel brakes plates, disc face cams secured upon said operating disc, and housing face cams secured upon said housing for cooperation with said disc face cams, the arrangement being such that upon rotation of said operating disc relative to said housing said face cams cause axial movement of said operating disc and said tension bolts whereby said innermost brake disc presses said housing brake plates and wheel brake plates against one another for locking said differential gear.

2. The combination as claimed in claim 1, comprising braking means for acting upon and resisting rotation of said operating disc.

3. The combination as claimed in claim 1, comprising a corrugated ring secured to said operating disc and constituting said disc face cams.

4. The combination as claimed in claim 1, comprising a corrugated ring secured to said housing and constituting said housing face cams.

5. The combination as claimed in claim 1, comprising a slipping disc with apertures through which said tension bolts pass and disposed for transmitting pressure between said operating disc and said tension bolts.

6. The combination as claimed in claim 1, said disc face cams and said housing face cams being of self-locking form such that force is needed to return them to their initial relative positions after locking of said differential gear has been effected.

7. The combination as claimed in claim 1, said disc face cams and said housing face cams being of self-releasing form such that they return automatically to their initial relative positions immediately upon the removal of a force which has acted upon said operating disc and has caused locking of said differential gear.

References Cited by the Examiner
UNITED STATES PATENTS 2,559,944  7/51  Chapp _____ 74—710.5
3,105,394  10/63  Salzmann _____ 74—710.5

FOREIGN PATENTS 722,376  12/31  France.

DON A. WAITE, *Primary Examiner.*